March 22, 1932.     O. J. ZOBEL     1,850,146

ELECTRICAL WAVE FILTER

Filed Nov 25, 1930     6 Sheets-Sheet 1

$$W_{1k}\, W_{2k} = W_{1k}(m)\, W_{2k}(m) = R^2$$
$$0 < m \leq 1.$$

*M Types*

Fig. 6b $$W_{1k}(m)\, W_{2k}(m) = W_{1k}(m,m')\, W_{2k}(m,m') = R^2$$
$$0 < m \leq 1;\ \ 0 < m' \leq 1$$

*MM' Types*

INVENTOR
O. J. Zobel
BY
ATTORNEY

March 22, 1932.   O. J. ZOBEL   1,850,146

ELECTRICAL WAVE FILTER

Filed Nov. 25, 1930   6 Sheets-Sheet 2

1, $y = \dfrac{W_{1k}}{R} = \dfrac{R}{W_{2k}}$

2, $y = \dfrac{W_{1k}(m)}{R} = \dfrac{R}{W_{2k}(m)}, (m = .6)$

3, $y = \dfrac{W_{1k}(m,m')}{R} = \dfrac{R}{W_{2k}(m,m')} \ (m = .7230, m' = .4134)$ ------ Dissipative $(V_k = \pm .01\, U_k)$

INVENTOR
O. J. Zobel
BY
ATTORNEY

March 22, 1932. O. J. ZOBEL 1,850,146
ELECTRICAL WAVE FILTER
Filed Nov 25, 1930 6 Sheets-Sheet 3

INVENTOR
O. J. Zobel
BY
ATTORNEY

March 22, 1932.         O. J. ZOBEL         1,850,146
ELECTRICAL WAVE FILTER
Filed Nov 25, 1930     6 Sheets-Sheet 5

1 Networks $y = \dfrac{Z_1}{R} = \dfrac{R}{Z_2}$

2 Wave-Filter $y = \dfrac{W_{1k}}{R} = \dfrac{R}{W_{2k}}$

------ Dissipative
$(V_k = \pm .01 U_k)$

Fig. 28

INVENTOR
O. J. Zobel
BY
ATTORNEY

March 22, 1932. O. J. ZOBEL 1,850,146
ELECTRICAL WAVE FILTER
Filed Nov. 25, 1930 6 Sheets-Sheet 6

INVENTOR
O. J. Zobel
BY
ATTORNEY

Patented Mar. 22, 1932

1,850,146

UNITED STATES PATENT OFFICE

OTTO J. ZOBEL, OF NEW YORK, N. Y., ASSIGNOR TO AMERICAN TELEPHONE AND TELEGRAPH COMPANY, A CORPORATION OF NEW YORK

ELECTRICAL WAVE FILTER

Application filed November 25, 1930. Serial No. 498,161.

This invention relates to selective circuits, and more particularly to selective circuits of the type known as wave filters. Various modifications have been proposed from time to time, of the wave filters originally described in patents to George A. Campbell Nos. 1,227,113 and 1,227,114 of May 22, 1917; the purpose of these modifications being to emphasize certain characteristics of the filter in order that it may more effectively perform the functions desired in a particular circuit. Of various patents issued to me bearing on the subject of wave filters, attention is called to Patent No. 1,538,964 of May 26, 1925, in which certain such modifications are described. And still further, in order to make clear the previous state of the art, reference may be made to an article by me entitled, "Theory and Design of Uniform and Composite Electric Wave Filters", published in The Bell System Technical Journal, January, 1923. In that publication there is described one of my modifications now known as the M-type of filters which has certain advantages fully described. In this invention I have carried the development further and will describe herein what I will call the MM' type, this having certain advantages over the preceding device which will appear from the following specification.

More particularly, one purpose is to obtain a filter which is adapted as a termination to other types of filters to form a composite filter of improved impedance characteristics.

Another purpose is to so design this new type of filter that when connected to other filters there shall be no impedance irregularities at the junctions.

Another purpose is to develop a filter which will permit maximum use of the transmitting bands and still avoid impedance irregularities.

Another purpose is to obtain a filter which gives a sharper increase in attenuation just outside the transmitting band combined with a good impedance characteristic.

Another purpose is to make efficient impedance simulating networks, especially for "constant $k$" wave filters and loaded lines. The expression "constant $k$" will be explained presently.

The invention will be better understood by reference to the following specification and the accompanying drawings in which.

In order better to understand the derivation of my MM'-type wave filter, a brief résumé is given of the properties of the filters from which the new type is derived. A more complete treatment of this subject, however, is given in my article in The Bell System Technical Journal cited above. Reference will be made in particular to the ladder type of structure in which $z_1$ and $z_2$ are the series and shunt elements, respectively.

Figure 1A:
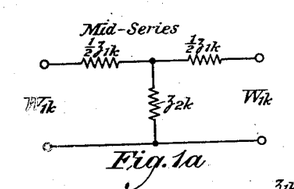
Figures 1a, 2a and 2b show sections of the simple "constant $k$" wave filter.

A mid-series section is that part between the midpoint of one series impedance $z_1$ and the midpoint of the next series impedance. It has the three impedance branches $$\tfrac{1}{2}z_1,\ z_2\ \text{and}\ \tfrac{1}{2}z_1$$

and has the structure of a T network as shown in Fig. 1a. Its image impedance at each end is the mid-series image impedance $W_1$.

Figure 2A:
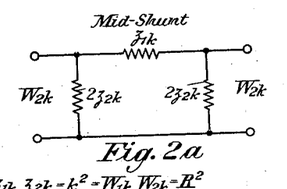

A mid-shunt section is that part between the midpoint of one shunt admittance $1/z_2$ and the midpoint of the next shunt admittance. It has the three impedance branches $2z_2$, $z_1$ and $2z_2$ and has the structure of a $\pi$ network as seen in Fig. 2a. Its image impedance at each end is the mid-shunt image impedance $W_2$. Both of the above sections have the same transfer constants, T, as we should expect since both sections represent one full interval of the ladder type structure.

Figure 2B:
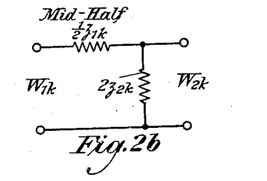

A mid-half section is that unsymmetrical part between the midpoint of one series impedance and the midpoint of the next shunt admittance, or vice versa as shown in Fig. 2b. The image impedances at the two ends are, respectively, $W_1$ and $W_2$, or vice versa. Its transfer constant is one-half that of a full section, mid-series or mid-shunt. Obviously, two mid-half sections when connected with like image impedances, $W_2$ or $W_1$, adjacent, will form the mid-series or mid-shunt section, respectively.

Formulas for the transfer constant T, of a full section and for the mid-series and mid-shunt image impedances, $W_1$ and $W_2$, are $$\cosh T = 1 + \tfrac{1}{2}\frac{z_1}{z_2}$$

$$W_1 = \sqrt{z_1 z_2 + \tfrac{1}{4} z_1^2},\quad (1)$$

and $$W_2 = \frac{z_1 z_2}{\sqrt{z_1 z_2 + \tfrac{1}{4} z_1^2}} = \frac{z_1 z_2}{W_1}$$

The following two results which apply to the general ladder type network, $z_1$, $z_2$, will be used later.

*Mid-series derivation*

From any ladder type network, $z_1$, $z_2$, it is possible to derive a more general one, $z_1'(m)$, $z_2'(m)$, which has the same mid-series image impedance, $W_1$, as the prototype, but a transfer constant, T $(m)$, and a mid-shunt image impedance, $W_2(m)$, which are functions of a parameter $m$. The relations between the series and shunt impedances of the more general derived network and those of the prototype are $$z_1'(m) = m z_1,$$

and $$z_2'(m) = \frac{1-m^2}{4m} z_1 + \frac{1}{m} z_2,\quad (2)$$

where $$0 < m \leq 1.$$

At the limit, $m=1$, it reduces to the prototype. (The exponent "prime" refers to the case of mid-series equivalence.)

*Mid-shunt derivation*

From any ladder type network, $z_1$, $z_2$, it is possible to derive a more general one, $z_1''(m)$, $z_2''(m)$, which has the same mid-shunt image impedance, $W_2$, as the prototype, but a transfer constant, T $(m)$, and a mid-series image impedance, $W_1(m)$, which are functions of a parameter, $m$. The relations between the series and shunt impedances of the more general derived network and those of the prototype are $$z_1''(m) = \frac{1}{\dfrac{1}{m z_1} + \dfrac{1}{\dfrac{4m}{1-m^2} z_2}}\quad (3)$$

and $$z_2''(m) = \frac{1}{m} z_2,$$

where $$0 < m \leq 1.$$

At the limit, $m=1$, it reduces to the prototype. (The exponent "second" refers to the case of mid-shunt equivalence.)

The parameter, $m$, is used to denote its association with "mid" of midpoint impedance since midpoints are considered here in ladder type networks.

A comparison of Formulas (1), (2) and (3) shows that for the same value of $m$ both derived networks have the same transfer constant, T $(m)$ and $$z_1'(m) z_2''(m) = z_1''(m) z_2'(m) = $$
$$W_1 W_2 = W_1(m) W_2(m) = z_1 z_2;$$

the series and shunt impedances of one derived structure are inverse networks of impedance product, $z_1 z_2$, of the shunt and series impedances, respectively, of the other. Similarly, the pair of impedances, $W_1$ and $W_2$, and the pair, $W_1(m)$ and $W_2(m)$, are also such inverse impedances.

*"Constant k" wave-filters*

The "constant k" wave filter of any class is a ladder type network of reactances in which the series impedance, $z_{1k}$, and shunt impedance, $z_{2k}$, have the relation $z_{1k} z_{2k} = k^2 =$ a constant, independent of frequency. (In this and what follows the additional subscript, $k$, implies a relation to the "constant k" wave filter.)

Such a wave filter of any class, that is, one having any preassigned transmitting and attenuating bands, can always be obtained, the formulas for the properties being given as $$\cosh T_k = 1 + 2(U_k + iV_k),$$

$$W_{1k} = \sqrt{1 + U_k + iV_k}\, R, \quad (4)$$

$$W_{2k} = R/\sqrt{1 + U_k + iV_k} = R^2/W_{1k}$$

where $T_k$ = transfer constant of a full section,
$W_{1k}$ = image impedance at a series midpoint,
$W_{2k}$ = image impedance at a shunt midpoint, $$U_k + iV_k = \frac{z_{1k}}{4z_{2k}},$$

and $$R^2 = z_{1k} z_{2k} = k^2 = \text{a constant}.$$

The transfer constant of a mid-half section =

$$\frac{1}{2} T_k.$$

When there is dissipation in the elements, the relation $z_{1k} z_{2k} = R^2$ is strictly satisfied by requiring that the condenser dissipation constant, $d'$, be equal to the coil dissipation constant, $d$, for each pair of inverse network elements. For example, $$\frac{(d+i)L2\pi f}{(d'+i)C2\pi f} = \frac{L}{C} = R^2.$$

Computations of the transfer constants of this and other sections from the anti-cosh formula are readily made by means of formulas given in a paper by me in The Bell System Technical Journal of July, 1928.

M-type wave filters

The M-type wave filters of any class are the two structures derived from the "constant $k$" wave filter of that class, assumed known, by applying the operations represented in general Formulas (2) and (3) of the mid-series and mid-shunt derivations. Where the prototype is the "constant $k$" wave filter, as in this case, I have used the letter M in the terminology of the derived structures to denote its connection with the single parameter, $m$, involved in the mid-point operation, and have shortened the expression "mid-series derived ladder type" to mid-series M-type; similarly, for the mid-shunt M-type.

The mid-series M-type has the same mid-series image impedance, $W_{1k}$, as the mid-series "constant $k$" section which is not a function of $m$; its mid-shunt image impedance, $W_{2k}(m)$, is, however, a function of $m$. Formulas for this structure are $$z_{1k}'(m) = m z_{1k},$$

$$z_{2k}'(m) = \frac{1-m^2}{4m} z_{1k} + \frac{1}{m} z_{2k},$$

$$\cosh T_k(m) = 1 + \frac{2m^2(U_k + iV_k)}{1 + (1-m^2)(U_k + iV_k)} \quad (5)$$

$$W_{1k} = \sqrt{1 + U_k + iV_k}\, R$$

$$W_{2k}(m) = \frac{1 + (1-m^2)(U_k + iV_k)}{\sqrt{1 + U_k + iV_k}} R$$

where $0 < m \leq 1$.

The mid-shunt M-type has the same mid-shunt image impedance, $W_{2k}$, as the mid-shunt "constant $k$" section which is not a function of $m$; its mid-series image impedance, $W_{1k}(m)$, is, however, a function of $m$. For this structure, (Bell System Technical Journal, January, 1923).

$$z_{1k}''(m) = \frac{1}{\dfrac{1}{m z_{1k}} + \dfrac{1}{\dfrac{4m}{1-m^2} z_{2k}}}$$

$$z_{2k}''(m) = \frac{1}{m} z_{2k},$$

$\cosh T_k(m)$ = same formula as in (5), (6)

$$W_{1k}(m) = \frac{\sqrt{1 + U_k + iV_k}}{1 + (1-m^2)(U_k + iV_k)} R,$$

and $$W_{2k} = \frac{R}{\sqrt{1 + U_k + iV_k}}$$

where $0 < m \leq 1$.

At the limit, $m=1$, these two structures reduce to those of the "constant $k$" wave filter; also $W_{1k}(m=1) = W_{1k}$ and $W_{2k}(m=1) = W_{2k}$.

The transfer constant of either mid-half section is $$\frac{1}{2} T_k(m).$$

These structures and their mid-half sections are shown in Figs. 3a, 3b, 4a and 4b.

Inverse network relations hold between the series and shunt impedances of these M-types.

MM'-type wave filters

The MM'-type wave filters of any class are the two structures derived from the M-type wave filters of that class by applying the operations represented in general Formulas (2) and (3) of the mid-series and mid-shunt derivations such as to obtain new structures. In these new derivations, the parameter $m'$ is used to distinguish it from the parameter $m$ already contained in the M-type impedances. Since both parameters, $m$ and $m'$, appear in the impedances of these new structures, the title, MM'-type has been chosen. Fundamentally these wave filters are structures which are derived from the "constant $k$" wave filter in two steps by the alternate application of the mid-series and mid-shunt derivations.

The mid-series MM'-type is derived from the M-type having Formulas (6) by using the operation of the mid-series derivation Formulas (2) and parameter $m'$. It has the same mid-series image impedance, $W_{1k}(m)$, as this M-type which is not a function of $m'$; its mid-shunt image impedance, $W_{2k}(m, m')$, is, however, a function of both $m$ and $m'$. Formulas for the structure are $$z_{1k}'(m, m') = \frac{1}{\frac{1}{mm'z_{1k}} + \frac{1}{\frac{4mm'}{1-m^2}z_{2k}}}$$

$$z_{2k}'(m,m') = \frac{1}{\frac{1}{\frac{m(1-m'^2)}{4m'}z_{1k} + \frac{m(1-m'^2)}{m'(1-m^2)}z_{2k}}} + \frac{1}{mm'}z_{2k}, \quad (7)$$

$$\cosh T_k(m,m') = 1 + \frac{2m^2m'^2(U_k + iV_k)}{1+(1-m^2m'^2)(U_k+iV_k)},$$

$$W_{1k}(m) = \frac{\sqrt{1+U_k+iV_k}}{1+(1-m^2)(U_k+iV_k)} R,$$

and $$W_{2k}(m,m') = \frac{1+(1-m^2m'^2)(U_k+iV_k)}{1+(1-m^2)(U_k+iV_k)} \cdot \frac{R}{\sqrt{1+U_k+iV_k}}$$

where $0 < m \leq 1$, and $0 < m' \leq 1$. As a limiting value $W_{2k}(m, m' = 1) = W_{2k}$.

The mid-shunt MM'-type is derived from the M-type having Formula (5) by using the operation of the mid-shunt derivation Formulas (3) and parameter $m'$. It has the same mid-shunt image impedance, $W_{2k}(m)$, as this M-type which is not a function of $m'$; its mid-series image impedance, $W_{1k}(m, m')$ is, however, a function of both $m$ and $m'$. It has the formulas $$z_{1k}''(m,m') = \frac{1}{\frac{1}{mm'z_{1k}} + \frac{1}{\frac{m'(1-m^2)}{m(1-m'^2)}z_{1k} + \frac{4m'}{m(1-m'^2)}z_{2k}}},$$

$$z_{2k}''(m, m') = \frac{1-m^2}{4mm'}z_{1k} + \frac{1}{mm'}z_{2k}, \quad (8)$$

$\cosh T_k(m, m') =$ same formula as in (7), $$W_{1k}(m, m') = \frac{1+(1-m^2)(U_k+iV_k)}{1+(1-m^2m'^2)(U_k+iV_k)} \cdot \sqrt{1+U_k+iV_k} \cdot R$$

$$W_{2k}(m) = \left[\frac{1+(1-m^2)(U_k+iV_k)}{\sqrt{1+U_k+iV_k}}\right] R,$$

where $0 < m \leq 1$, and $0 < m' \leq 1$. As a limiting value $W_{1k}(m, m' = 1) = W_{1k}$.

The transfer constant of either mid-half section is $$\frac{1}{2} T_k (m, m').$$

These structures are shown in Figs. 5a, 5b, 6a and 6b.

The series and shunt impedances of one derived structure are inverse networks (of impedance product $R^2$) of the shunt and series impedances, respectively, of the other. Also $$W_{1k}(m) W_{2k}(m) = W_{1k}(m, m') W_{2k}(m, m') = R^2$$

Comparison of Formulas 7 and 5 shows that the transfer constant of the MM'-type is the same as that of an M-type whose parameter is the product, $mm'$.

Figure 7:
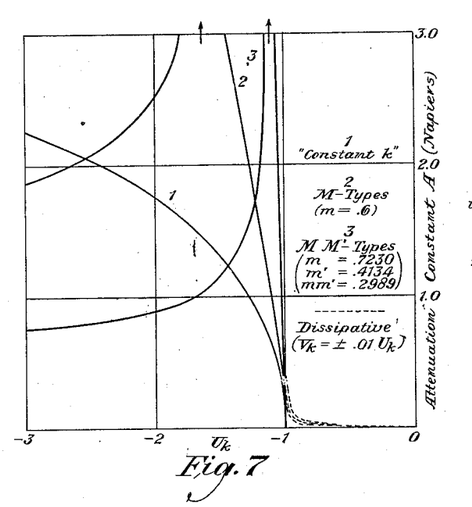
Figs. 7, 8 and 9 show the various characteristics of my new filter as compared with those of the simpler forms from which it is derived.
Figure 8:
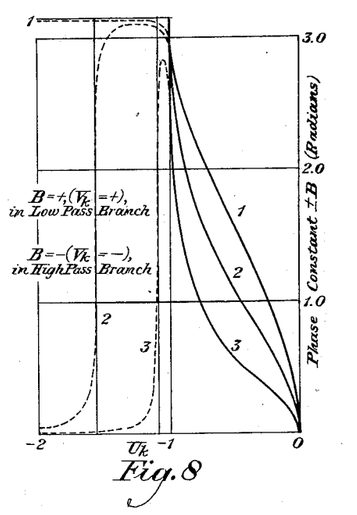

It will be noted from Fig. 7 that the steepness in the attenuation of my new MM' type wave filter is much greater than for the M-prototype filter and still greater than the "constant $k$" type for the particular values of the parameters chosen. It is the property, however, of this MM'-type, that the frequency of infinite attenuation lies rather close to the cut-off point after which the attenuation falls off. In cases, therefore, where it would be desired to have the attenuation quite high for regions remote as well as close to the cut-off frequency, it is desirable to build a composite filter made up of one or more sections of the combinations of the three types represented in Fig. 7. The new type disclosed herein lends itself readily to such composite structure for the reason, as appears from the theory, that the impedance irregularities can be made zero. More specifically, the terminal wave filter networks to be considered can all be connected on the image basis with the "constant $k$" wave filter, considered as a standard wave filter, or any other wave filter having an equivalent image impedance, $W_{1k}$ or $W_{2k}$. There are two of these composite structures, here to be disclosed, designated mid-series or mid-shunt, depending upon whether they are to connect with the mid-series or mid-shunt termination of the "constant $k$" wave filter.

Figure 3A:
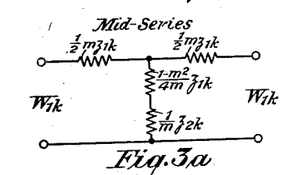
Figs. 3a, 3b, 4a and 4b are sections of the M-type of wave filters described in my article mentioned above.
Figure 3B:
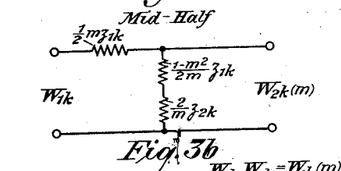
Figure 6A:
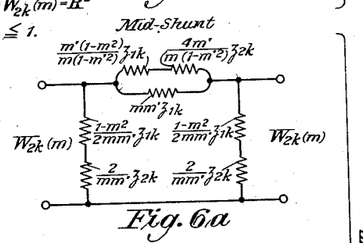
Figure 6B:
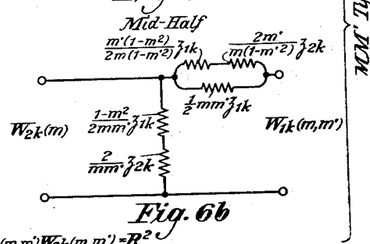
Figure 10:
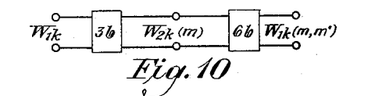
Figs. 10, 11 and 12 relate to the connection of two half sections for purposes hereinafter described.
Figure 11:
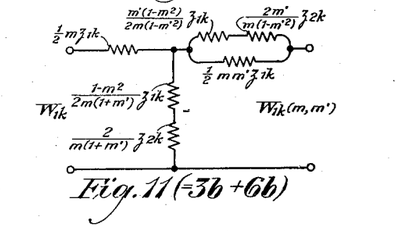

The mid-series general terminal wave-filter network is made up of two different mid-half sections, that of Fig. 3b and that of Fig. 6b, connected in tandem with image impedances $W_{2k}(m)$ adjacent, as shown in Figs. 10 and 11. This gives a composite wave filter structure which has a transfer constant equal to $$\frac{1}{2}[T_k(m) + T_k(m, m')]$$

and the image impedances $W_{1k}$ and $W_{1k}(m,m')$, as shown in Fig. 11. The terminals having the image impedance $W_{1k}$ are to connect with the wave filter proper whose image impedance is $W_{1k}$, and the other terminals having the image impedance $W_{1k}(m, m')$ are to connect with a receiving impedance R.

Figure 4A:
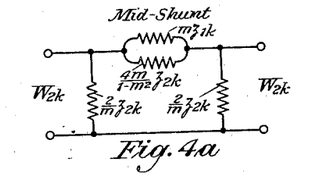
Figure 4B:
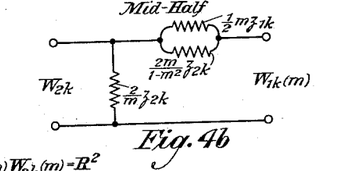
Figure 5A:
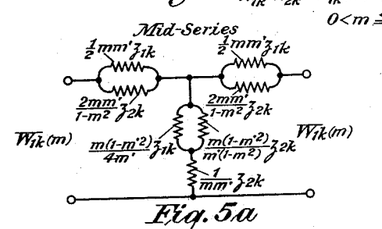
Figs. 5a, 5b, 6a and 6b are sections of my new form of MM'-type wave filter.
Figure 5B:
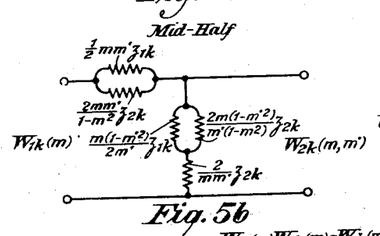
Figures 13, 14, 15:
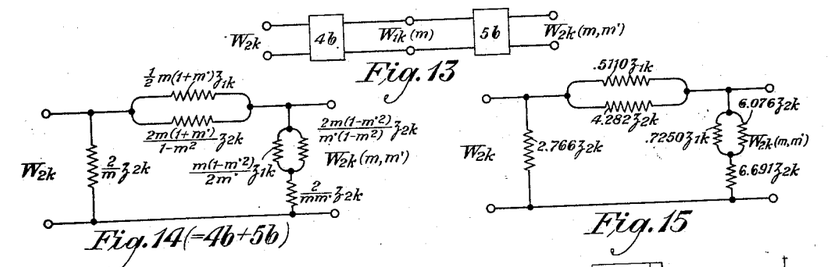
Figs. 13, 14 and 15 show a similar combination, but in a modified form.
Figure 16:
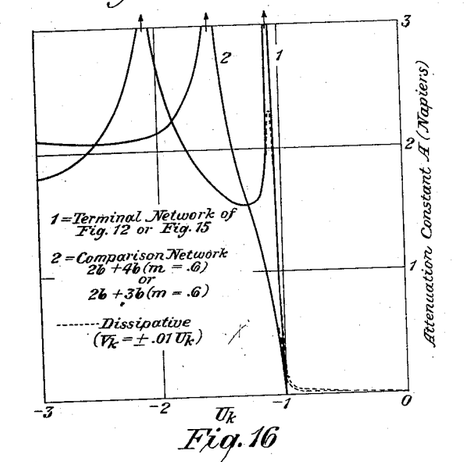
Figs. 16, 17 and 18 give the characteristics of such combinations in comparison with those of simpler design.
Figure 17:
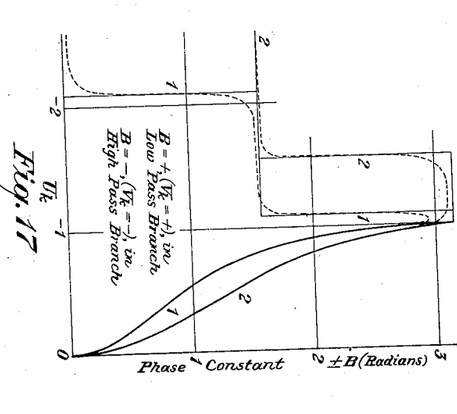

The mid-shunt general terminal wave filter network is made up of the mid-half sections of Fig. 4b and Fig. 5b, connected in tandem with image impedances $W_{1k}(m)$ adjacent, as shown in Figs. 13 and 14. This gives a composite wave filter structure which has a transfer constant equal to that above, namely $$\frac{1}{2}[T_k(m) + T_k(m, m')]$$

and the image impedances $W_{2k}$ and $W_{2k}(m, m')$, as shown in Fig. 14. The terminals having the image impedance $W_{2k}$ are to connect with the wave filter proper whose image impedance is $W_{2k}$ and the other terminals having the image impedance $W_{2k}(m, m')$ are to connect with a receiving impedance R.

The terminal image impedances $W_{1k}(m, m')$ and $W_{2k}(m, m')$ are functions of the parameters $m$ and $m'$, as well as of $U_k$ and $V_k$ which are functions of frequency belonging to the "constant k" wave filter. When there is no dissipation in the network elements, $V_k = 0$ and these impedances are pure resistances in all transmitting bands. These resistances can be given a variety of characteristics depending upon the choice of $m$ and $m'$. We are primarily interested here, however, in those characteristics which represent approximately constant impedances equal to R over the entire useful part of a transmitting band.

Such an approximately ideal characteristic is obtained by requiring these image impedances to have the value R at two representative points in a transmitting band other than at $U_k = 0$. This fixes the values of the two parameters $m$ and $m'$ and definitely determines the entire general network in terms of $z_{1k}$ and $z_{2k}$, assumed known.

The procedure for determining the parameters $m$ and $m'$ is as follows: We have from (7) and (8) the ratio $$y = \frac{W_{1k}(m,m')}{R} = \frac{R}{W_{2k}(m,m')} = \left(\frac{1+a(U_k+iV_k)}{1+b(U_k+iV_k)}\right)\sqrt{1+U_k+iV_k} \quad (9)$$

where $a = 1 - m^2$,
and $b = 1 - m^2 m'^2$.

Since $m$ and $m'$ lie between zero and unity, it follows that $0 \leq a \leq b < 1$. Assuming no dissipation, $V_k = 0$ and $$y = \left(\frac{1+aU_k}{1+bU_k}\right)\sqrt{1+U_k}. \quad (10)$$

Here $y = 1$ at $U_k = 0$, irrespective of the magnitudes of $a$ and $b$. Hence, to fix the latter requires the values of $y$ at two non-zero values of $U_k$, as already stated. For generality, let the requirements be $$y = y_1 \text{ at } (U_k)_1, \quad (11)$$

and $$y = y_2 \text{ at } (U_k)_2.$$

Rewriting (10) we get the general linear equation in $a$ and $b$ $$-ua + vb = w, \quad (12)$$

where $$u = -U_k\sqrt{1+U_k},$$
$$v = -yU_k,$$

and $$w = y - \sqrt{1+U_k}.$$

Substitution of (11) in (12) gives two simultaneous linear equations for the determination of the constants $a$ and $b$, namely $$-u_1 a + v_1 b = w_1,$$

and $$-u_2 a + v_2 b = w_2.$$

Their solution gives $$a = \frac{v_1 w_2 - v_2 w_1}{u_1 v_2 - u_2 v_1}, \quad (13)$$

and $$b = \frac{u_1 w_2 - u_2 w_1}{u_1 v_2 - u_2 v_1}.$$

Also $$m = \sqrt{1-a},$$

and $$m' = \sqrt{\frac{1-b}{1-a}}. \quad (14)$$

An illustration of the use of these general formulas is now given. After a few preliminary trials, their application shows that very satisfactory results are obtained with the required values $$y_1 = 1, (U_k)_1 = -.65;$$

and $$y_2 = 1, (U_k)_2 = -.90,$$

for then there is less than a two per cent. departure of $y$ from the constant value, unity, over the continuous range from $U_k = 0$ to $U_k = -.92$, which range includes the useful part of the band. From (13) $a = .4773$, and $b = .9107$; whence from (14) $m = .7230$, and $m' = .4134$.

Figure 12:
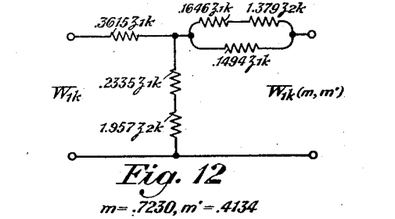

Of course, other values in this neighborhood would also be quite satisfactory, but the above are the ones which will be taken here in the final networks for illustrative purposes. The results are shown in Figs. 12 and 15.

From (10) it is found that the maximum and minimum values of $y$ $$\left(\text{where } \frac{dy}{dU_k}=0\right)$$

occur at the two points $$U_k=\frac{-(3a-b)\pm\sqrt{(3a-b)^2-4ab(1+2a-2b)}}{2ab}. \quad (15)$$

Figure 18:
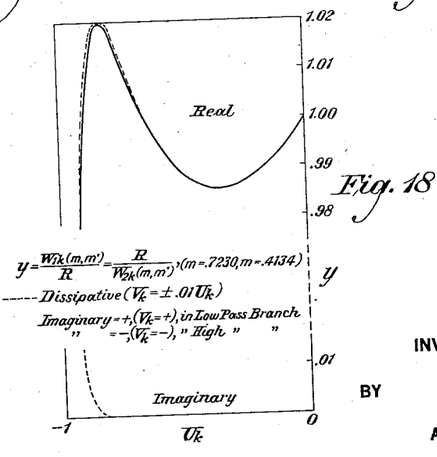

Substitution of the above values gives a minimum $y=-.9857$ at $U_k=-.3696$ and a maximum $y=1.0198$ at $U_k=-.8297$. The characteristic of $y$ is shown in detail in Fig. 18 on a much enlarged scale. The real part is seen to depart less than 2% from the ideal value of unity and the imaginary part, due to dissipation, is seen to be very small.

It should be pointed out that other characteristics than an approximately constant $y$ are possible from the above general formulas.

The derivations and discussions thus far have been on the basis of using a "constant $k$" filter as the prototype but it is evident that any ladder type of structure might be used in which the series element is $z_1$ and the shunt element is $z_2$. Thus if the load is not a constant resistance but is a function of frequency then something other than the "constant $k$" filter might be indicated and the filters of higher order, analogous to the M-type or the MM'-type, would bear the same relationship to this prototype as those already set forth. In this case R would be replaced in the various equations by $\sqrt{z_1 z_2}$ so that Equation 9 for example, would become $$y=W_1(m,m')/\sqrt{z_1 z_2}=\sqrt{z_1 z_2}/W_2(m,m')$$

Using these more general impedances, $z_1$ and $z_2$, the relationship between the initial prototype, the M-type and MM'-type filters may be made more evident by the following table which will be found to be consistent with Figs. 1a to 6b of the drawings.

In these relations all the $z$'s, except those of the prototype, are functions of $m$ or of $m$ and $m'$.

It is evident that one might go to filters of higher order of complexity, such as MM'M''-type which would be related to the MM'-type in the same way as the latter is related to the type one order lower. While such types will have impedance characteristics which would be considered as improvements over the types of lower order, in practice, I find that the increase in complexity is such as not to warrant the order higher than MM'.

Figure 9:
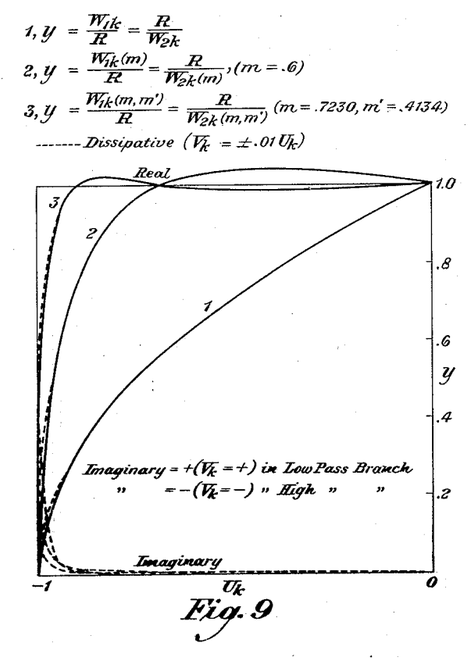

Coming back to the particular design considered, one of the advantages of MM'-type is the improvement which it shows over the M-type from the standpoint of constant image impedance over the transmitting band, this improvement over the M-type being similar to that which the M-type shows over the "constant $k$" type. (See Fig. 9.) In fact it is this improvement in the impedance characteristic which constitutes the chief advantage of the MM'-type filters; for the desired propagation characteristic, such as a given steepness of attenuation outside the transmitting band, can be obtained with an M-type filter of appropriate value of $m$. The basis for improved impedance characteristic lies in the presence of two parameters, $m$ and $m'$, instead of one as in the M-type or none as in the "constant $k$" type. In the MM'M''-type there would be three parameters and therefore opportunity for still greater choice in impedance characteristic. But again it is to be borne in mind that the same propagation characteristic may be obtained with an M-type filter as with any of the higher order filters. On the other hand, if it is desired to use an MM'M''-type section in order to more closely match the impedance of a given load through the transmitting band and at the same time to connect properly to a "constant $k$" filter it will be necessary to have a

*Initial prototype*
Series $z_1$
Shunt $z_2$

*M-types*

*Series M-type*
Series $z_1'=mz_1$

Shunt $z_2'=\frac{1-m^2}{4m}z_1+\frac{1}{m}z_2$

*Shunt M-type*
Series $z_1''=mz_1$ parallel to $\frac{4m}{1-m^2}z_2$

Shunt $z_2''=\frac{1}{m}z_2$

*MM'-types*

*Series MM'-type*
Series $z_1'''=m'z_1''$

Shunt $z_2'''=\frac{1-m'^2}{4m'}z_1''+\frac{1}{m'}z_2''$

*Shunt MM'-type*
Series $z_1''''=m'z_1'$ parallel to $\frac{4m'}{1-m'^2}z_2'$

Shunt $z_2''''=\frac{1}{m'}z_2'$ compositing link of three half sections instead of two half sections as described on pages 11 and 12. In this case also an improvement in attenuation constant outside the transmitting band is possible for just as the link of a half section of M-type and a half section of MM'-type gives a double lineup or two regions of infinite attenuation, (see Fig. 12) so three half sections would give three lineups or three regions of infinite attenuation with comparatively high attenuation between the lineups. Thus a high attenuation is maintained from a region very close to the transmitting band to a region far removed therefrom where the attenuation due to the prototype is itself high.

In the graphs of Figs. 7 to 9 and 16 to 18, it will be noted that $U_k$ has been used rather than frequency. This is a matter of convenience only and still permits ready interpretation of the curves. More strictly, the relation is $$U_k + iV_k = \frac{z_{1k}}{4z_{2k}} \quad (16)$$

It is possible at any time to reduce these curves to a frequency relation since the frequency is a function of $z_{1k}/4z_{2k}$. Thus, in a low pass filter, where $f_2$ = critical frequency $$\frac{f}{f_2} = \sqrt{-U_k} \text{ (Assuming } V_k \text{ to be negligible)}.$$

In these same Figs. 7 to 9 and 16 to 18, the effect of dissipative resistance is shown by the dotted lines. In a non-dissipative, multiple band, "constant $k$" wave filter, $U_k$ ranges with increasing frequency from 0 to $-1$ in a low-pass band; from $-1$ to 0 and back to $-1$ in an internal band; and from $-1$ to 0 in a high-pass transmitting band. An internal transmitting band is thus seen to consist of two branches which are confluent at $U_k = 0$; at frequencies below this point of confluency it is what may be termed a high-pass branch, while at frequencies above, it is a low-pass branch. All transmitting bands of a "constant $k$" wave filter may thus be regarded as made up of single or confluent low-pass and high-pass branches. Their distribution on the frequency scale depends upon the relation between $U_k$ and frequency $f$.

The difference between the characteristics of a low-pass branch and a high-pass branch, although similar functions of $U_k$ in both branches, is mainly due to a proper choice of sign for the phase constant in the formulas. This is determined by the sign of $V_k$ upon the introduction of small positive dissipation. Let us allow dissipation in all elements so as to keep the relation $z_{1k} z_{2k} = R^2$, as before, by having equal coil and condenser dissipation constants for each pair of inverse network elements; then $$\frac{z_{1k}}{4z_{2k}} = \left(\frac{z_{1k}}{2R}\right)^2 = U_k + iV_k.$$

In general, we may write $$\frac{z_{1k}}{2R} = r_{1k} + ix_{1k},$$

where $r_{1k}$ must always be positive for it is due to positive resistance in $z_{1k}$. Then from the above $V_k = 2r_{1k} x_{1k}$. Now it is known that $x_{1k}$ is positive or negative depending upon whether it is in a low-pass or a high-pass branch; also the phase constant $B_k$ has the sign of $V_k$. Hence, $B_k$ is positive in a low-pass branch and negative in a high-pass branch, being of the same magnitude but opposite in sign for the same value of $U_k$ but opposite values of $V_k$. In the drawings, the general effect of small dissipation, on the above basis, is shown by assuming that $V_k = \pm .01 U_k$. Single characteristics represent both branches, wherein the proper signs are to be taken for the phase constants and the reactance components of the image impedances introduced by dissipation. The same considerations hold also for the M-types and MM'-types as functions of $U_k$ for the same class of wave filter.

Figure 19:
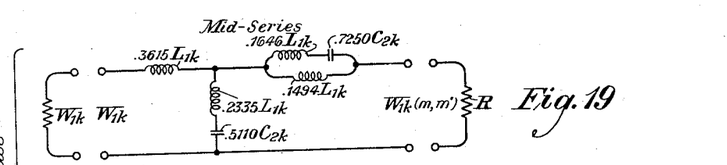
Figs. 19 to 24 show more specific applications of my invention to adapt them for certain terminal conditions.
Figure 20:
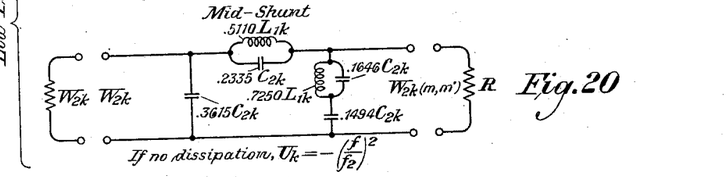
Figure 21:
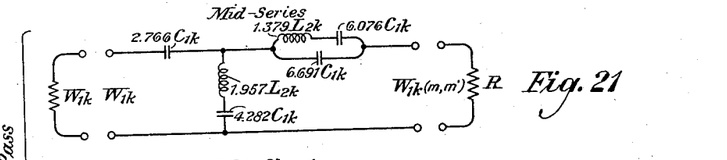
Figure 23:
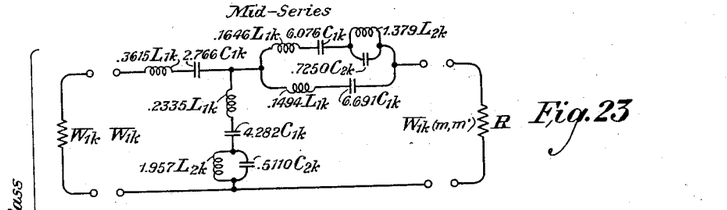
Figure 24:
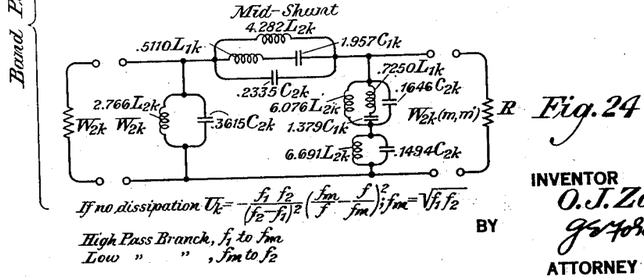

While a large portion of this description has been specific to one section or another section, it is to be understood that any number of sections of one kind may be connected in series, or sections of different kinds may be connected in series, the requirement being that the image impedances shall match at each junction point. To illustrate further the use of the above general results, the networks of Figs. 12 and 15 have been translated into the designs which they might assume for three important classes. The low-pass terminal networks are shown in Figs. 19 and 20; the high-pass in Figs. 21 and 22; and the band-pass in Figs. 23 and 24. In each case, the magnitudes of the elements of the "constant $k$" wave filter are obtainable from well known formulas, and it will be noted that in these, as well as in all of the new filter sections, the series and shunt elements are made up of combinations of $z_{1k}$ and $z_{2k}$, the series and shunt impedances of the "constant $k$" wave filter of any class, that is, for the low-pass, the high-pass, the band-pass filters, etc. The characteristics of the circuits of Figs. 19 to 24 may be expressed as a function of the frequency $f$ by translating the general curves shown in Figs. 7 to 9 or Figs. 16 to 18 from $U_k$ to $f$ by the relation between $U_k$ and $f$ shown in each case. It may also be added that any two-terminal branch of three or more elements may be given other forms by equivalent impedance transformations such as given in my article of The Bell System Technical Journal for January, 1923, referred to above.

From the above description, it will be seen that I have devised a type of wave filter section which shows an improved impedance charactertistic in that it has a more nearly constant image impedance throughout all transmitting bands than either the best M-type or the "constant $k$" wave filter, and this impedance is nearly a pure resistance. (See Fig. 9). Further than this, the section has a steeper attenuation characteristic as one leaves the transmitting band. (See Fig. 7). Finally, it lends itself favorably to the building up of a composite filter by a connecting link which comprises a section which has an image impedance on the one side to match that of an MM'-type and on the other side to match that of a prototype such as the "constant $k$" type. (See Figs. 11 and 14); this section itself being made up of a half section of the MM'-type and a half section of the intermediate type such as the M-type. At the junction of the two half sections, the image impedance will be the same in both directions so that there are no irregularities. To this link on the one side may be connected the load of constant resistance R and on the other side the "constant $k$" filter or as many sections of any desired type to give the over-all propagation characteristic desired. Thus sections of the M-type of different $m$ values may be introduced between the "constant $k$" type filter and the compositing link or terminal wave filter network without impedance changes or irregularities at the junctions as seen from Figs. 3a and 4a. It would also be possible, but not so practical from a cost basis, to insert sections of desired characteristics between the two halves of the compositing link, or even to introduce such sections between the link and the load. Also while the explanation has been made in connection with a definite filter it is equally applicable to loaded lines; which may be looked upon as ladder structures.

The filter sections of the kind herein disclosed may be employed advantageously in networks to simulate the impedance of certain transducers; a few examples will be disclosed in connection with Figs. 25 to 31.

To simulate the image impedance of a "constant-$k$" wave filter with mid-series termination, a network section such as shown in Fig. 12 may be closed across its right hand pair of terminals by a pure resistance of value $R=k$, then its impedance across the left hand pair of terminals will closely simulate the wave filter impedance. Such a simulating network is shown in Fig. 25, in which $z_{1k}$ and $z_{2k}$ are the series and shunt impedances respectively of the "constant $k$" filter that is simulated.

Figure 26:
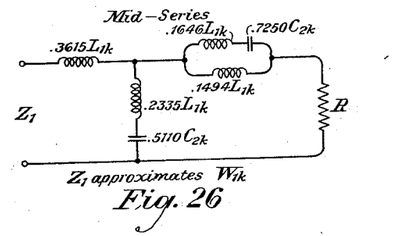

If this filter is a low pass filter with each series impedance $z_{1k}$ embodied in a series inductance $L_{1k}$ and each shunt impedance embodied in a shunt capacity $C_{2k}$, then the simulating network takes the form shown in Fig. 26, which will be readily understood on comparison with Fig. 19. In case it is desired to simulate the impedance of a high pass filter with mid-series termination, the resistance R will be put across the right hand pair of terminals of the network of Fig. 21.

Figure 22:
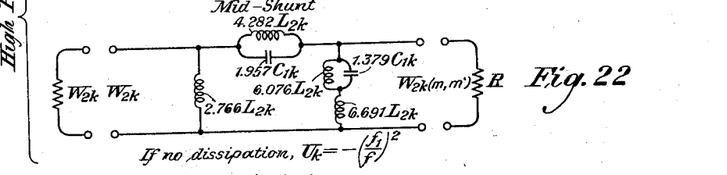

In case it is desired to simulate the impedance of any "constant $k$" filter at mid-shunt termination, the simulating network will be represented by Fig. 15 with resistance R across its right hand terminals. If the wave filter whose impedance is to be simulated is a low pass filter the simulating network will be as shown in Fig. 20 with resistance R across its right hand terminals. If this filter is a high pass filter then the network will be as shown in Fig. 22, with R across its right hand terminals.

Figure 25:
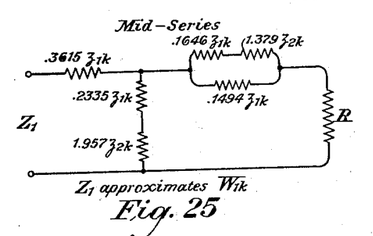
Figs. 25 and 26 are diagrams of a network of the present invention employed to simulate the impedance of a "constant $k$" wave filter, and more particularly a low pass filter.

Having shown the structure for simulating the impedance of a low pass filter in Fig. 26, and having pointed out how the structure may be built up to simulate the impedance of a high pass filter, the procedure will readily be understood for other classes of "constant $k$" filters, starting in each case from Fig. 25 or from Fig. 15 and a resistance R, and making use of the known forms of $z_{1k}$ and $z_{2k}$.

Figures 27, 28:
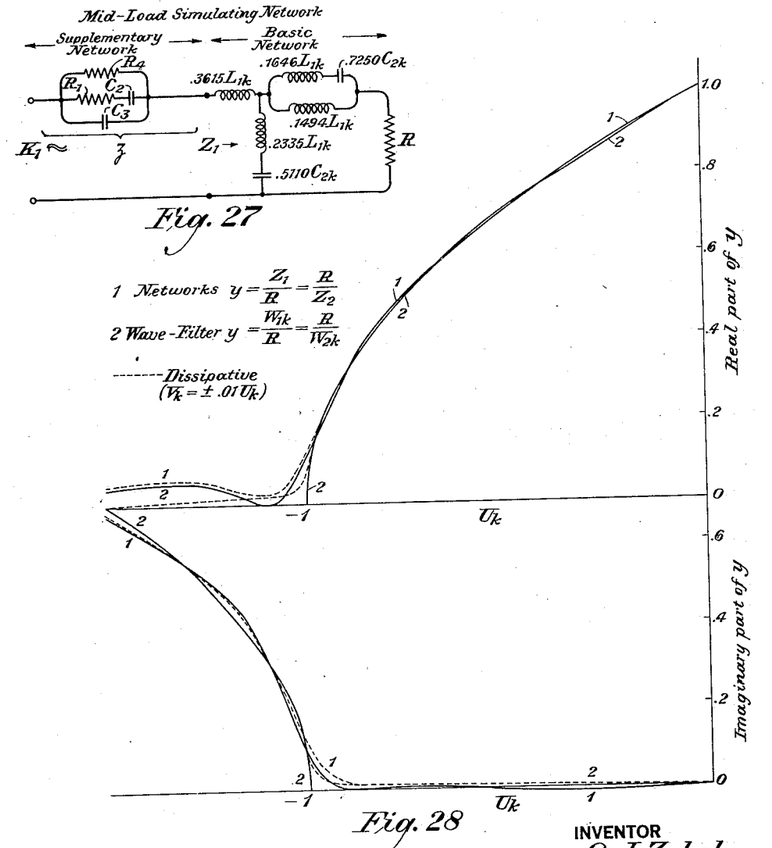
Fig. 27 is a diagram of a network of the present invention employed to simulate the impedance of a loaded line.
Figs. 28, 29, 30 and 31 are curve diagrams showing the mode of operation of apparatus built according to Figs. 25, 26 and 27.

Fig. 28 shows the degree of simulation as computed wherein the impedances are functions of the general variables, $U_k$ and $V_k$. These variables are defined by the impedance ratio $$\frac{z_{1k}}{4z_{2k}} = \left(\frac{z_{1k}}{2R}\right)^2 = U_k + iV_k.$$

For the "constant $k$" wave filter, where $z_{1k} z_{2k} = R^2$, $$\frac{W_{1k}}{R} = \frac{R}{W_{2k}} = \sqrt{1+U_k+iV_k}.$$

The variation of the impedances with respect to frequency depends upon the relations between $U_k$ and $V_k$ and the frequency, which are different for each class of wave filter. If the elements of $z_{1k}$ and $z_{2k}$ are assumed to be non-dissipative, $V_k=0$. To show the general effect of dissipation in a simple manner the values of $V_k$ were taken in the computations such that $V_k=-.01\ U_k$ in a low-pass branch, and $V_k=+.01\ U_k$ in a high-pass branch. It will be seen that over most of a transmitting branch, which corresponds to the range from $U_k=0$ to $U_k=-1$, the networks simulate $W_{1k}$ and $W_{2k}$ within a few per cent. Near a critical frequency, where $U_k=-1$, the simulation is improved by dissipation. In the attenuating range the simulation is still quite satisfactory, this is because the networks have considerable attenuation in the attenuating bands so that the effects of the impedance irregularities at these frequencies between each network and its terminating resistance R will be reduced in transmission and the impedance across the other pair of terminals will approximate $W_{1k}$ or $W_{2k}$, respectively.

Loaded line impedances may be simulated advantageously by the use of the networks herein disclosed. It is a well-justified assumption that either midpoint impedance of a loaded line in its principal transmitting band is approximately equal to the corresponding midpoint impedance of a "constant $k$" low-pass wave filter as the basic network, with the series addition of the impedance of a supplementary network which simulates the additional impedance introduced by dissipation at low frequencies. Therefore the proper complete network to simulate a loaded line will consist of a series combination of a basic network and a supplementary network each of which will now be pointed out in some detail. If the loaded line impedance is to be simulated at mid-load, then the basic network will be as shown in Fig. 26. If the simulation is to be at mid-section, then the basic network will be as shown in Fig. 20 with the right hand pair of terminals closed through a resistance R. In either case the supplementary network will be the same; it contributes substantial impedance only at the lower frequencies of the transmission range of the loaded line. This will be pointed out presently in connection with Figs. 29, 30 and 31, especially Fig. 31.

The supplementary network may have different forms; a good one for the purpose is shown in Fig. 27, where it is labeled "supplementary network". This figure shows the complete simulating network for mid-load termination of the loaded line. For mid-section termination, the supplementary network would be the same, but the basic network would be as shown in Fig. 20 with a resistance R across the right hand pair of terminals in Fig. 20.

The magnitudes of the elements of these networks are all determined from the actual loaded-line impedances as computed from the formulas (or perhaps measured as sending-end impedances), instead of directly from certain primary line and coil data. This takes account of variations with frequency of the constants, such as line leakance and loading-coil resistance. The shunt capacity of a loading coil is assumed to be concentrated, half at each end, and each half is added in the formulas to the line capacity of the adjacent section.

The mid-load iterative impedance is given by the formula $$K_1 = k\sqrt{\left(1+\frac{zL}{2k}\tanh\frac{s\gamma}{2}\right)\left(1+\frac{zL}{2k}\coth\frac{s\gamma}{2}\right)}; \quad (17)$$

and there is a corresponding formula for the mid-section iterative impedance.

Referring to Fig. 27, the magnitudes of the elements of the basic network are known when R and $f_2$ are known, R being the impedance, $$\sqrt{L_{1k}/C_{2k}}$$

and $f_2$ being the critical or cut-off frequency of the loaded line. Accordingly, $L_{1k}=R/\pi f_2$ and $C_{2k}=1/\pi f_2 R$. The impedance in the essential frequency range is given quite accurately by $$Z_1 \approx R\sqrt{1-(f/f_2)^2} = r \quad (18)$$

This relation will be used for design purposes. The values of R and $f_2$ are here determined for any particular loaded line by assuming that at two frequencies, $f_a$ and $f_b$, the corresponding values of $r$, respectively $r_a$ and $r_b$, are equal to the resistance components of $K_1$ as computed at those frequencies from (17). The frequencies $f_a$ and $f_b$ are chosen in the upper part of the desired range where the reactance components of $K_1$ are small. Substitution of these values in (18) gives two linear equations in $R^{-2}$ and $f_2^{-2}$ from which $$R = r_a\sqrt{\frac{1-\left(\frac{f_a r_b}{f_b r_a}\right)^2}{1-\left(\frac{f_a}{f_b}\right)^2}},$$

and $$f_2 = f_b\sqrt{\frac{1-\left(\frac{f_a r_b}{f_b r_a}\right)^2}{1-\left(\frac{r_b}{r_a}\right)^2}}. \quad (19)$$

The actual impedance, $Z_1$, of the network with these values may be computed as for any finite network. A computation similar to the foregoing may be made for the basic network for a mid-section ending of the loaded line.

The supplementary network of Fig. 27 has an impedance expression of the form $$z = \frac{a_0+a_1 if}{1+b_1 if - b_2 f^2} = r+ix, \quad (20)$$

where $a_0 = R_4$,
$a_1 = 2\pi R_1 R_4 C_2$,
$b_1 = 2\pi(R_1 C_2 + R_4 C_2 + R_4 C_3)$,
$b_2 = 4\pi^2 R_1 R_4 C_2 C_3$.

The resistance and capacity elements are obtained from the above impedance coefficients as $R_1 = a_0 a_1^2 / (a_0 a_1 b_1 - a_0^2 b_2 - a_1^2)$,
$C_2 = (a_0 a_1 b_1 - a_0^2 b_2 - a_1^2)/2\pi a_0^2 a_1$, (21)
$C_3 = b_2/2\pi a_1$,
$R_4 = a_0$ From (20) the pair of impedance linear equations is $$a_0 + fxb_1 + f^2 rb_2 = r,$$
$$fa_1 - frb_1 + f^2 xb_2 = x. \quad (22)$$

With the above formulas we can proceed to indicate the method of design.

Ideally the network should have the impedance characteristic $$z = r + ix = K_1 - Z_1. \quad (23)$$

To fix the four impedance coefficients, assume that the network has the ideal components of (23) at two important low frequencies, the data with increasing frequency being, $$f_1, \; r_1 + ix_1;$$
$$f_2, \; r_2 + ix_2.$$

These values are to be substituted in (22) to obtain four linear equations. The solution of these linear equations gives $$a_0 = r_1 - f_1 x_1 b_1 - f_1^2 r_1 b_2,$$
$$a_1 = r_1 b_1 - f_1 x_1 b_2 + x_1/f_1, \quad (24)$$

$$b_1 = \frac{f_1 f_2 (f_1 x_1 - f_2 x_2)(r_1 - r_2) + (f_1 x_2 - f_2 x_1)(f_1^2 r_1 - f_2^2 r_2)}{D},$$

$$b_2 = \frac{f_1 f_2 (r_1 - r_2)^2 + (f_1 x_1 - f_2 x_2)(f_2 x_1 - f_1 x_2)}{D},$$

where $$D = f_1 f_2 [(f_1^2 r_1 - f_2^2 r_2)(r_1 - r_2) + (f_1 x_1 - f_2 x_2)^2].$$

From the values of $a_0$, $a_1$, $b_1$ and $b_2$ the network constants can be computed by Formulas (21). The network impedance is then given at any frequency by Formula (20). The actual impedance simulating $K_1$ is the sum, $Z_1 + z$.

The procedure for the supplemental network to simulate impedance at mid-section will be apparent from the foregoing. The supplemental network has the same form for either ending, mid-load or mid-section.

It should be pointed out here that the supplementary network may, if desired, be given other structural forms having two resistances and two capacities and having an equivalent impedance characteristic. These other forms may be obtained by transformations from the known one above or their elements determined from other formulas corresponding to those of (21).

Likewise, a supplementary network which has a smaller or larger number of elements than the one above might be used satisfactorily with the same basic networks. That depends upon the low-frequency impedance characteristics of the given loaded line and upon the closeness of simulation desired.

To exemplify the present invention more specifically in this connection, a mid-load design will here be outlined for a 19-gauge B-88-50 loaded side circuit.

Data for the mid-load basic network, taken from computations for $K_1$, are $$f_a = 3000, \quad r_a = 1324;$$
$$f_b = 5000, \quad r_b = 720.$$

These give from (19) R=1564.4 ohms, and $f_2$=5632 cycles per second.

If the values of $r_a$ and $r_b$ are computed likewise for mid-section instead of mid-load, they will be found to give R=1564.6 ohms, and $f_2$=5638 cycles per second. Because of the close agreement in these values for mid-load and mid-section, their approximate mean values will be taken, and the results will be applicable either for mid-load or mid-section, without substantial error. Accordingly, the design will be based on the values R= 1565 ohms and $f_2$=5635 cycles per second. These give $L_{1k}$=88.38 mh., and $C_{2k}$=.03611 mf. We have then for the mid-load basic network of Fig. 27, the inductance and capacity elements, .3615 $L_{1k}$=31.95 mh.;  .5110 $C_{2k}$=.01845 mf.;
.2335 $L_{1k}$=20.64 mh.;  .7250 $C_{2k}$=.02618 mf.;
.1646 $L_{1k}$=14.55 mh.;
.1494 $L_{1k}$=13.20 mh.;

and a corresponding set of values for the mid-section basic network.

Figure 30:
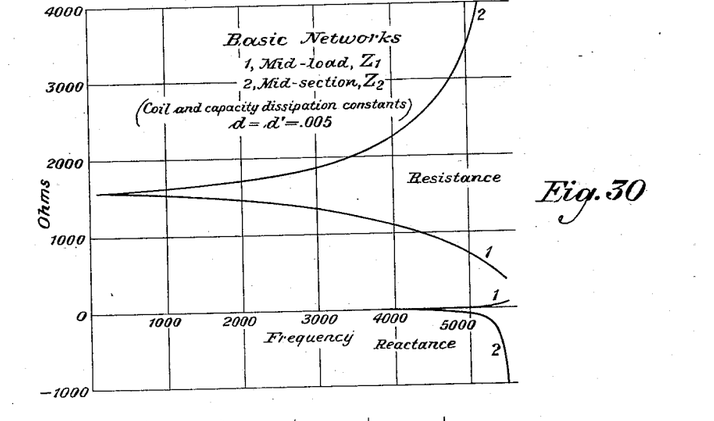

The impedance characteristics of this mid-load basic network of Fig. 27 and the corresponding mid-section basic network have been computed directly from the finite network; the results are shown in Fig. 30.

Increasing the amount of dissipation in the reactance elements would tend to increase the reactance components of this impedance at the upper frequencies.

The design of the supplementary network of Fig. 27 has been made from low frequency data representing the average values of $(\overline{K}_1 - Z_1)$ and $(\overline{K}_2 - Z_2)$ where $\overline{K}_2$ and $Z_2$ have the same relation to mid-section that $\overline{K}_1$ and $Z_1$ have to mid-load. The data are $$f_1 = 100, \quad r_1 + ix_1 = 152 - i\,700;$$
$$f_2 = 300, \quad r_2 + ix_2 = 20 - i\,252.$$

From Formulas (24) we obtain $$a_0 = 7839.0; \quad a_1 = 233.12;$$
$$b_1 = 17.600 \cdot 10^{-2}; \quad b_2 = 30.481 \cdot 10^{-4}.$$

From (21) these give $$R_1 = 5327 \text{ ohms}; \quad C_2 = .8886 \text{ mf.};$$
$$C_3 = 2.081 \text{ mf.}; \quad R_4 = 7839 \text{ ohms}.$$

Figure 31:
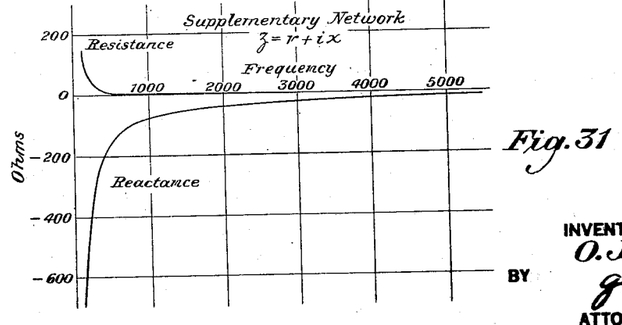

The impedance characteristic as computed from Formula (20) is shown in Fig. 31.

Figure 29:
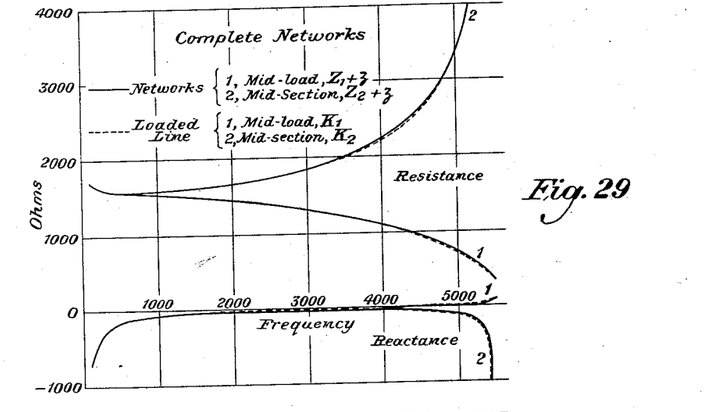

Final results showing the characteristics of the complete simulating networks are compared with those of the loaded line in Fig. 29. Simulation is within .7 per cent. of the impedance over the continuous range from 100 to 3000, within 2 per cent. from 3000 to 5000, and within 4 per cent. from 5000 to 5500 cycles per second; the per cent. accuracy is best in the case of the mid-section network. This upper frequency is approximately 97 per cent. of the critical frequency, 5635 cycles per second.

What is claimed is:

1. A wave filter of the MM'-type in which the series and shunt elements of a section bear the same relation to the corresponding elements of the M-type filter that the M-type bears to the "constant $k$" type.

2. A wave filter of the MM'-type in which the series and shunt elements are related to the corresponding elements of a "constant $k$" type filter by the two parameters $m$ and $m'$.

3. A wave filter of the ladder type and related to the prototype "constant $k$" filter, the series element and the shunt element being each derived from the elements of the prototype as definite functions of two arbitrarily chosen parameters $m$ and $m'$.

4. A wave filter designated as MM'-type in which a mid-series section has the series element equal to the series element of the M mid-shunt multiplied by a factor $m'$ and has the shunt element equal to the series element of the M mid-shunt multiplied by $$\frac{1-m'^2}{4m'}$$

plus the shunt element of the M mid-shunt multiplied by $$\frac{1}{m'}.$$

5. A wave filter of the ladder type in which the series and shunt elements of a mid-series section are related to the series and shunt elements of $z_1''$ and $z_2''$ of a mid-shunt section of an M-type filter in such manner that the series element is equal to $z_1''m'$ and the shunt element is equal to $$z_1''\frac{1-m'^2}{4m'}$$

in series with $$z_2''\frac{1}{m'};$$

the $z_1''$ itself being equal to $mz_1$ in parallel to $$\frac{4m}{1-m^2}z_2$$

and the $z_2''$ being equal to $$z_2\frac{1}{m}$$

where $z_1$ and $z_2$ are respectively the series and shunt elements of a ladder filter and $m$ and $m'$ are constants for any one filter.

6. A wave filter of the ladder type in which the series and shunt elements of a mid-shunt section are related to the series and shunt elements of $z_1'$ and $z_2'$ of a mid-series section of an M-type filter in such manner that the series element is equal to $z_1'm'$ in parallel with $$z_2'\frac{4m'}{1-m'^2}$$

and the shunt element is equal to $$z_2'\frac{1}{m'};$$

the $z_1'$ itself being equal to $z_1m$ and the $z_2'$ being equal to $$z_1\frac{1-m^2}{4m}+z_2\frac{1}{m}$$

where $z_1$ and $z_2$ are respectively the series and shunt elements of a type of ladder filter and $m$ and $m'$ are constants for any one filter.

7. A wave filter of the MM'-type in which the series and shunt elements of a mid-series or a mid-shunt section are related to the series and shunt elements of a mid-shunt or a mid-series section of an M-type in the same way that the series and shunt elements of a mid-series or a mid-shunt section of an M-type filter are related to the series and shunt elements of a "constant $k$" type.

8. A wave filter of the MM'-type in which the series and shunt elements of a section bear the same relation to the corresponding elements of the M-type filter that the M-type bears to the "constant $k$" type, the image impedance of the section being substantially constant over the transmitting band.

9. A wave filter of the general M-type but of higher order of complexity, the wave filter bearing the same relation to the prototype filter one order lower than the M-type of the first order bears to the "constant $k$" type.

10. A composite wave filter of the MM'-type as described in claim 1 and the "constant $k$" type characterized by the condition that there shall be no impedance irregularities at the junction of the sections.

11. A composite wave filter of the MM'-type as described in claim 1 and the "constant $k$" type, a connecting link between the two portions, each side of said link having the image impedance which matches that of the filter with which it is to be connected.

12. A composite wave filter of the MM'-type as described in claim 1 and the "constant $k$" type, a connecting link between the two portions comprising two half filter sections one half section having an impedance on the one side to match the MM'-type section the other half section having an impedance on the one side to match the "constant $k$" type section and the other sides of each half sections having equal image impedances.

13. In a composite wave filter, a connecting link with an impedance on the one side matching that of a "constant $k$" type filter and on the other side matching that of an MM'-type.

14. In a composite wave filter, a connecting link with an impedance on the one side matching that of a "constant $k$" type filter and on the other side having an impedance of substantially constant resistance over the transmitting band.

15. An element in a wave filter comprising a half section network whose impedance on the one side matches a mid-impedance of an M-type filter and on the other side matches a mid-impedance of an MM'-type.

16. An impedance simulating network comprising a network section composed of two half sections, one of M-type and the other of MM'-type, and closed by a resistance.

17. A network to simulate the impedance of a transducer whose impedance is like that of a low pass filter such for example as the impedance of a loaded line, said network comprising two half sections, one of M-type and the other of MM'-type.

18. A network to simulate the impedance of a loaded line consisting of an M—MM' terminal section having two pairs of terminals, a resistance across one pair of terminals, said section and resistance forming a basic network and a supplemental network in series with the other pair of terminals, said supplemental network being adapted to develop impedance principally at low frequencies.

19. A network to simulate the impedance of a transducer whose impedance characteristic is of the general type of a "constant $k$" ladder type filter, said network comprising the network shown in Fig. 25 in which $z_{1k}$ is the series impedance of said "constant $k$" filter and $z_{2k}$ is the shunt impedance thereof.

20. A network to simulate the impedance of a loaded line, consisting of the basic network and the resistance R and the supplementary network of Fig. 27 combined as in said figure.

In testimony whereof, I have signed my name to this specification this 24th day of November, 1930.

OTTO J. ZOBEL.